Aug. 3, 1937.  W. A. ROEHM  2,089,100

VALVE

Filed Nov. 16, 1936

INVENTOR.
William A Roehm,
BY
ATTORNEYS.

Patented Aug. 3, 1937

2,089,100

UNITED STATES PATENT OFFICE 2,089,100

VALVE

William A. Roehm, Lynbrook, N. Y.

Application November 16, 1936, Serial No. 111,013

4 Claims. (Cl. 251—8)

The invention relates to valves and more particularly to valves for use in connection with flexible tubings, such as for example rubber hose. It has for its main object to provide a valve which, when attached to a hose, may be readily opened and closed, and adjusted to pass the fluid in any desired amount. Another object is to provide means in the valve which will positively prevent leakage from any of the joints in the valve.

A further object is to so construct the valve that it will act as a handle for the hose on which used. Additional objects are to provide a valve of attractive appearance, having no parts apt to be broken or get out of order, which needs no packings, which can be attached and detached from a hose with a minimum expenditure of time and labor, and which can be manufactured at a comparatively low cost.

These and various other objects and advantages will be readily understood from the following description and from the accompanying drawing of a preferred embodiment of the invention, in which, however, modifications may be made without departing from the scope of the appended claims. In the drawing Fig. 1 is a side view of the valve;

Figure 4:
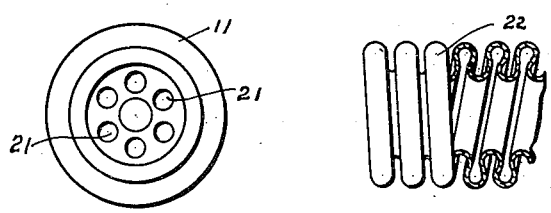
Fig. 4 is an end view.

Referring now to all the views, simultaneously, the valve consists of a rear header 10 and a front header 11 which are connected by a sleeve 12. The front and rear headers are provided with threaded shoulders 13 and 14 which engage in internal threads formed in the sleeve 12. The threads on the shoulders 13 and 14 are preferably made opposite so that one is right handed and the other left handed. An internal thread 15 is cut in a recess formed in the rear end of the rear header 10, while an externally threaded shoulder 16 is formed on the front header 11. A valve stem 17, carrying a valve 18 at its rear end, is riveted in the front header, as shown at 19. This valve seats in a valve seat 20 formed in the rear header. A plurality of openings 21 are provided in the front header, as plainly shown in Fig. 4.

Figure 1:
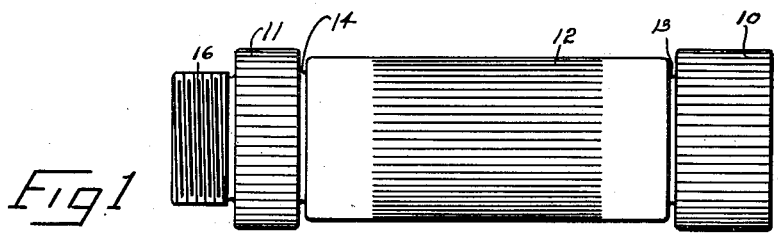
Figure 2:
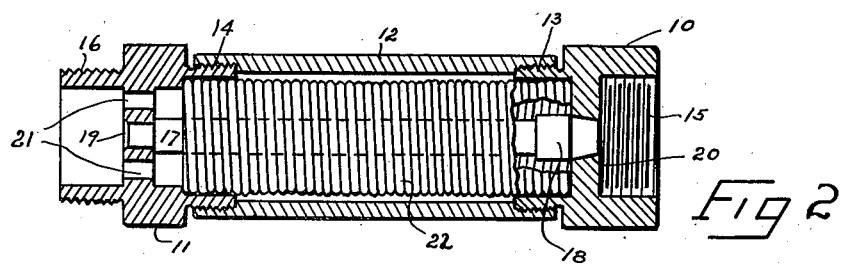
Fig. 2 is a cross-sectional, side view showing the valve closed.
Figure 3:
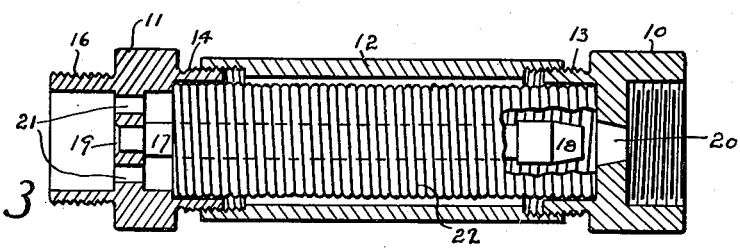
Fig. 3 is a similar view, showing the valve open.

Inasmuch as the thread on the front and rear headers and in the sleeve are right and left handed, it is evident that, when the sleeve is turned in relation to the headers, these will be drawn together or forced apart according to which way the sleeve is turned. Thus, when turned in one direction, the valve 18 will be caused to be seated in the valve seat 20 and thus closing the valve, while if turned in the opposite direction the valve will be removed from the valve seat, as in Fig. 3, and thus the valve will be opened.

Figure 5:
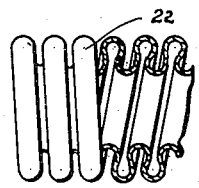
Fig. 5 is a side view, shown partly in cross section, of one of the parts employed in the valve.

To prevent leakage between the threads of the front and rear headers and the sleeve, a piece of flexible metal tubing 22, of the type plainly illustrated in Fig. 5, is employed. This tubing, which is well known on the market, is constructed in the manner shown in Fig. 5, and has the properties of not only being flexible but that it can be distended by pulling the corrugations apart. In Fig. 5 the tubing is shown slightly distended. The ends of this tube are soldered in interior recesses formed in the rear and front header, so that when the sleeve is turned in relation to the headers, the tubing will be lengthened and shortened according to which way the sleeve is turned. As the fluid passes through the inside of this tubing it is evident that no leakage can take place at the threads of the sleeve.

While the valve may find many other uses, it is particularly well suited for use with hoses of all kinds, such as for example garden hoses. In such case the hose is attached to the rear header and an ordinary nozzle to the front header. The valve may also be used by being inserted anywhere in the line of a flexible tubing, either of the rubber type or, for example, of the type shown in Fig. 5, and need not necessarily be attached on the end. While I have spoken of the headers as the rear and front header, it is evident that the water might be caused to flow in either direction through the valve.

While I prefer to make the headers with right and left handed threads, as this causes a very rapid action of the valve, it is evident that only one of the headers would need to be threaded; in fact other means than threads might be employed for distending the headers or bringing them towards each other.

From the foregoing it will be seen that this valve may find many practical uses; that it is simple in construction; that it requires no packing, outside of the packings used for attaching it to the hose; and that, while providing an efficient handle for a hose, it may at the same time be easily manipulated as a valve.

Having described the invention and its objects, what I claim as new and wish to protect by Letters Patent is:—

1. A valve of the class described comprising a front header and a rear header; a valve seat formed in one of said headers and a valve secured to the other; a sleeve interposed between the headers; means associated with the headers and the sleeve for drawing the headers together, to close the valve, and for separating the headers, to open the valve; and a distensible member secured between the inner ends of the headers and contained within the sleeve.

2. A valve of the class described comprising a threaded front header and a threaded rear header; the threads of one header being right handed and the threads on the other being left handed; a valve seat formed in one of said headers and a valve secured to the other; an internally threaded sleeve secured on said headers; said sleeve adapted to be turned in one direction to close the valve and the opposite direction to open the valve; and a distensible member secured between the inner ends of the headers and contained within the sleeve.

3. A valve of the class described comprising a front header and a rear header; a valve seat formed in one of said headers and a valve secured to the other; a sleeve interposed between the headers; means associated with the headers and the sleeve for drawing the headers together, to close the valve, and for separating the headers, to open the valve; and a corrugated, flexible metal tube secured between the inner ends of the headers and contained within the sleeve.

4. A valve of the class described comprising a threaded front header and a threaded rear header; the threads of one header being right handed and the threads on the other being left handed; a valve seat formed in one of said headers and a valve secured to the other; an internally-threaded sleeve secured on said headers; said sleeve adapted to be turned in one direction to close the valve and in the opposite direction to open the valve; and a corrugated, flexible metal tube secured between the inner ends of the headers and contained within the sleeve.

WILLIAM A. ROEHM.